United States Patent Office 3,613,463
Patented Oct. 19, 1971

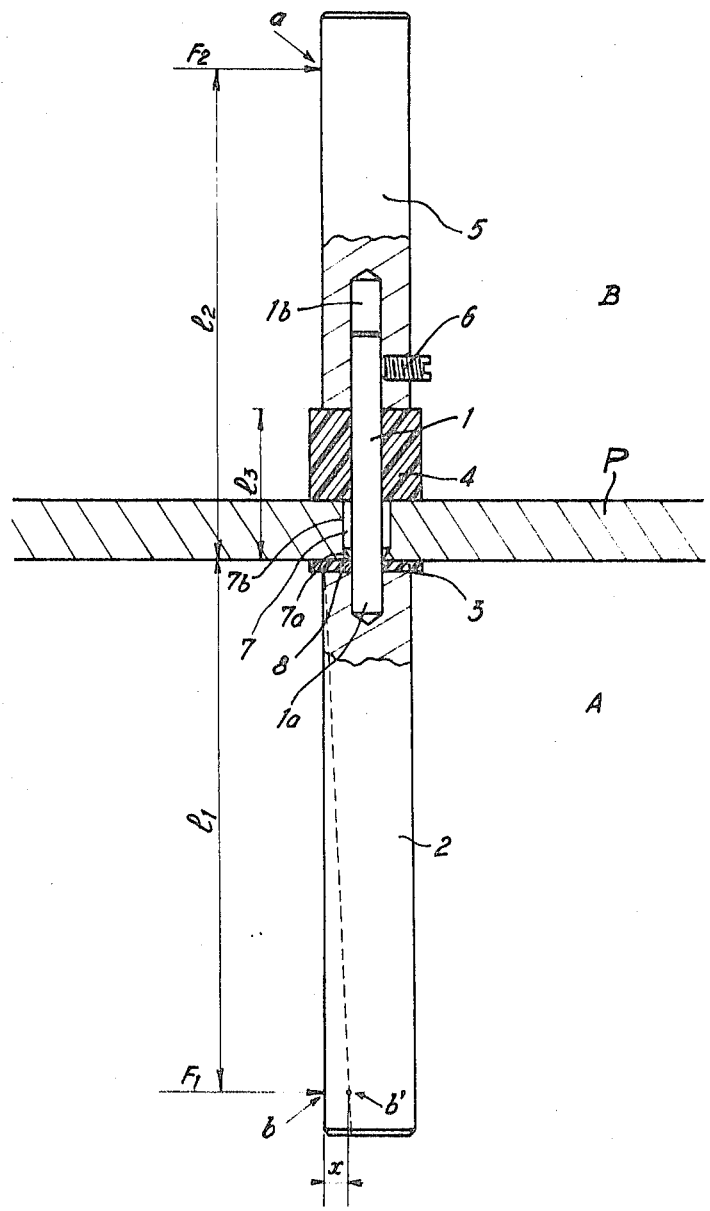

3,613,463
DEVICE FOR PROVIDING MECHANICAL TRANSMISSION THROUGH THE WALL OF AN ENCLOSURE
Michel Midy, Pavillon-sous-Bois, France, assignor to MECI—Materiel Electrique de Controle et Industriel, Paris, France
Filed Dec. 17, 1969, Ser. No. 885,945
Claims priority, application France, Dec. 30, 1968, 182,274
Int. Cl. F16j 15/50
U.S. Cl. 74—18.1
8 Claims

ABSTRACT OF THE DISCLOSURE

A device providing mechanical transmission through the wall of an enclosure, comprising a passage in the wall the inner end of which passage terminates at a reduced diameter circular lip which encircles with substantially line contact a transmission rod which extends through the passage and is capable of tilting therein, and a resilient sealing member disposed and retained against the inner surface of the enclosure wall around the rod to seal the passage.

---

This invention relates to a device providing mechanical transmission through the wall of an enclosure.

Transmission systems are known, and are described, for example, in French patent specifications Nos. 1,137,524 and 1,506,322, comprising a transmission rod which extends through and is retained in a passage in the wall of an enclosure so that when a force or a movement is applied to the rod within the enclosure, the rod can tilt relatively to the passage axis, the enclosure remaining sealing-tight.

It is an object of this invention to provide an improved form of such a device, which can transmit a force or movement through a wall and be able to withstand a pressure of 100 bars or more within the enclosure while being much less stiff than the known systems. Pressures and all other quantities in this specification are expressed in metric units. The stiffness of the known devices is of the order of 35 nm./rad., whereas it is an object of this invention to provide a system with a stiffness of the order of 0.01 nm./rad., the word "stiffness" denoting the ratio of the torque applied to the rod in the enclosure to the resulting angular movement movement of the rod. The invention therefore facilitates the use of apparatus for measuring or comparing very small forces, inter alia a pneumatic or electromagnetic apparatus, a feature which very few of the conventional devices can provide.

Thus it is a further object of the invention to provide a transmission rod system which can measure small forces in a hermetic enclosure containing high pressures, and which is small and inexpensive.

In the device according to the invention the passage in the enclosure wall terminates at its inner end in a circular lip thin enough to encircle with substantially line contact a rod which extends through the passage; and a resilient member is disposed and retained in the enclosure against the inner surface of the wall around the rod, to seal the passage.

Other features of the invention will be apparent from the following description of an embodiment, which is shown in section and as an enlarged scale in the single figure of the accompanying drawing.

In the drawing, the reference A denotes the inside, and the reference B the outside, of an enclosure having a wall P. The device according to the invention providing mechanical transmission through the wall P comprises a transmission rod 1 which extends through a passage 7 in the wall P. Passage 7 comprises a frusto-conical part 7a whose smaller end 8 is the aperture at the interior end of the passage 7. The rest of the passage 7 is formed by a cylindrical part 7b.

A resilient sealing member 3 is disposed and retained in the enclosure against the inside surface of the wall P and around the rod 1. The rod 1 and the member 3 are retained in the required axial positions by retaining members, in this case comprising two rods 2, 5. Rod 2 is secured to the end 1a of rod 1 which extends into the enclosure, and rod 5 is secured to the end 1b of rod 1 which extends outside the enclosure. Rod end 1a is introduced into an axial bore in rod 2; rod 1 and rod 2 are fixedly interconnected, for instance by welding. In constructional variants, the rods 1 and 2 can be secured to one another by screwthreaded engagement or crimping or in some other way which prevents any chance of leakage by way of the rod 2. The rod outer end 1b is introduced into an axial bore in rod 5 and releasably retained therein (so that the system can be assembled and dismantled) by a releasable element in the form of a screw 6 which extends through a lateral passage in rod 5 into the axial bore therein.

Advantageously, a resilient pad element 4 is disposed around the rod 1 between, and in contact with, the outside surface of wall P and the end surface of rod 5 which faces the outside surface of wall P. Preferably, the element 4, which co-operates with the two rods 2, 5 to retain member 3 in contact with the inside surface of wall P, is of the same resilient material as the member 3 but thicker than the latter. Alternatively, the element 4 could be replaced by a spring.

The resilient member 3 is made of a material having a low elasticity modulus. One possibility is an elastomer, preferably on a silicone base, e.g. "Silastène," whose elasticity modulus E is approximately 50 bars, or a polyvinyl-chloride or an equivalent rubber. Usually the elasticity modulus of the material used for the member 3 will be less than 2500 bars and is preferably between 10 and 100 bars. The thickness of member 3 is less than 0.2 mm. Because of the thinness of member 3, the zone of articulation of the rod 1 relative to member 3 when rod 1 pivots is very near the ideal articulation zone defined by the bevelled edge 8 of the passage 7. A consequence is a very low stiffness.

Preferably, the rod 1 has a diameter of approximately 0.6 mm. and is made of a high elastic limit steel such as 40 NGD 19 steel which has an elastic limit of 18 kbar. The rods 2, 5 are of greater cross-section than the rod 1 and have a diameter of approximately 2 mm.

A measured-valve signal $F_1$ applied inside the enclosure at point $b$ on rod 2 is converted by the device into a signal $F_2$ measured at a point $a$ on rod 5 outside the enclosure by measuring or force-comparing device (not shown).

The moment $F_1 \times l_1 = F_2 \times l_2$ is limited by the maximum stress produced on the rod 1; such stress is, given the dimensions mentioned, 4.3 kbar for a 90 nm. torque, which corresponds to the maximum force of the measuring device (30 g.) applied at 3 cm. from the edge 8 and is very much less than the elastic limit of the material of the rod 1.

If the point $a$ is kept stationary by the force detector to transmit the force $F_1$, the point $b$ must move through a distance $x$ dependent upon the length $l_3$. If the latter is increased, the measured-value signal (the force $F_1$) can be replaced by the movement $x$ from $b$ to $b'$.

What I claim as my invention and desire to secure by Letters Patent is:

1. A device providing mechanical transmission through a wall bounding an enclosure, comprising means in said wall defining a passage therethrough, said passage having its inner end of reduced diameter defined by a circular lip, a transmission rod having an inner end and an outer end and extending through and tiltable in said passage, said lip encircling said transmission rod with essentially line contact, a resilient sealing member encircling said rod, and means retaining said sealing member against the inner surface of said enclosure wall to said seal inner end of said passage, said means retaining said sealing member comprises an inner retaining member secured to said transmission rod and an outer resilient element disposed around the transmission rod and in contact with the outside surface of said enclosure wall.

2. A device providing mechanical transmission through a wall bounding an enclosure, comprising means in said wall defining a passage therethrough, said passage having its inner end of reduced diameter defined by a circular lip, a transmission rod having an inner end and an outer end and extending through and tiltable in said passage, said lip encircling said transmission rod with essentially line contact, a resilient sealing member encircling said rod, retaining means retaining said transmission rod within said passage and said sealing member against the inner surface of said enclosure wall to seal said inner end of said passage, said retaining means comprising an inner retaining member disposed inwardly of said sealing member, means securing said inner retaining member to said inner end of said transmission rod, an outer retaining member, and means securing said outer retaining member to said outer end of said transmission rod.

3. A device according to claim 2 in which said inner end of said transmission rod is fixedly secured in a bore of said inner retaining member and said outer end of said transmission rod is releasably secured in a bore in said outer retaining member.

4. A device according to claim 3 in which the means releasably securing said outer end of said transmission rod in said outer retaining member comprises a screw in screwthreaded engagement with a threaded aperture which extends through said outer retaining member as far as said bore therein.

5. A device according to claim 2 in which said outer retaining member has an inner end surface facing the outer surface of said wall, and which includes a resilient element disposed between and in contact with said inner end surface and said outer surface.

6. A device according to claim 1 in which said resilient sealing member is made of a material having an elasticity modulus of less than 2500 bars.

7. A device according to claim 6 in which said elasticity modulus is between 10 and 100 bars.

8. A device according to claim 6 in which said material is a silicone-based elastomer.

References Cited

UNITED STATES PATENTS 2,995,041    8/1961    Rowan _____ 74—18

FOREIGN PATENTS 936,990    8/1948    France _____ 74—18.1

W. F. O'DEA, Primary Examiner

F. D. SHOEMAKER, Assistant Examiner

UNITED STATES PATENT OFFICE
CERTIFICATE OF CORRECTION

Patent No. 3,613,463    Dated October 19, 1971

Inventor(s) MICHEL MIDY

It is certified that error appears in the above-identified patent and that said Letters Patent are hereby corrected as shown below:

Column 3, line 8,    Cancel "said seal" and substitute therefor ---seal said---

Signed and sealed this 11th day of April 1972.

(SEAL)
Attest:

EDWARD M. FLETCHER, JR.
Attesting Officer

ROBERT GOTTSCHALK
Commissioner of Patents